March 24, 1925.

C. B. KING ET AL 1,530,563

MOTOR

Filed May 18, 1923

Carl B. King.
Ernest Withers.
INVENTOR

BY Victor J. Evans.
ATTORNEY

March 24, 1925.

C. B. KING ET AL 1,530,563

MOTOR

Filed May 18, 1923

Carl B. King.
Ernest Withers.

INVENTOR

BY Victor J. Evans.

WITNESS:

ATTORNEY

March 24, 1925.  1,530,563

C. B. KING ET AL
MOTOR
Filed May 18, 1923  3 Sheets-Sheet 3

Carl B. King.
Ernest Withers.
INVENTOR
BY Victor J. Evans.
ATTORNEY

Patented Mar. 24, 1925.

1,530,563

UNITED STATES PATENT OFFICE.

CARL B. KING AND ERNEST WITHERS, OF FORT SUMNER, NEW MEXICO.

MOTOR.

Application filed May 18, 1923. Serial No. 639,833.

*To all whom it may concern:*

Be it known that we, CARL B. KING and ERNEST WITHERS, citizens of the United States, residing at Fort Sumner, in the county of De Baca and State of New Mexico, have invented new and useful Improvements in Motors, of which the following is a specification.

This invention relates to a rotary motor, the general object of the invention being to provide a motor of light weight and few parts so that it can be manufactured at low cost and which will consume the minimum amount of fuel.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1:
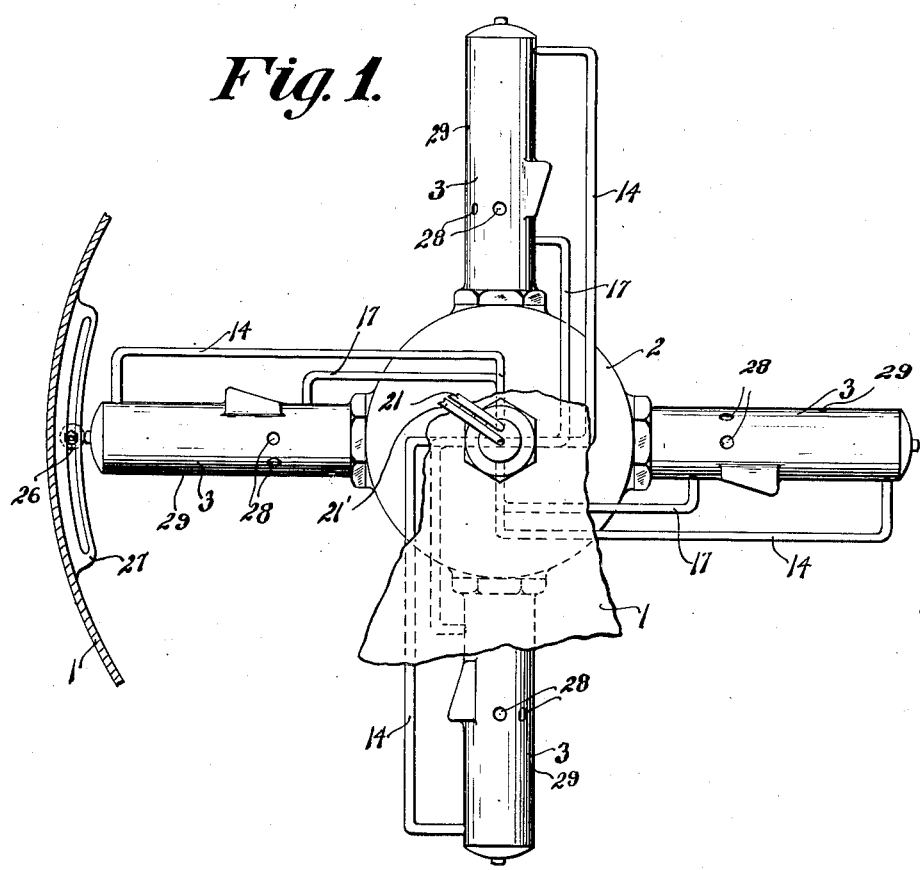
Figure 1 is an elevation of the interior parts of the invention with the supporting frame broken away.
Figure 4:
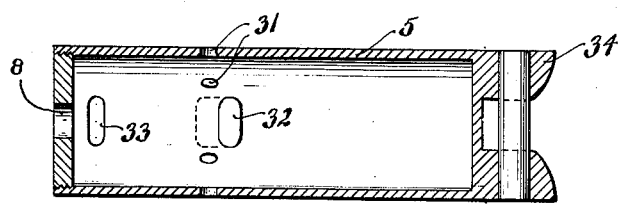
Figure 4 is a sectional view through one of the hollow pistons.
Figures 2, 5:
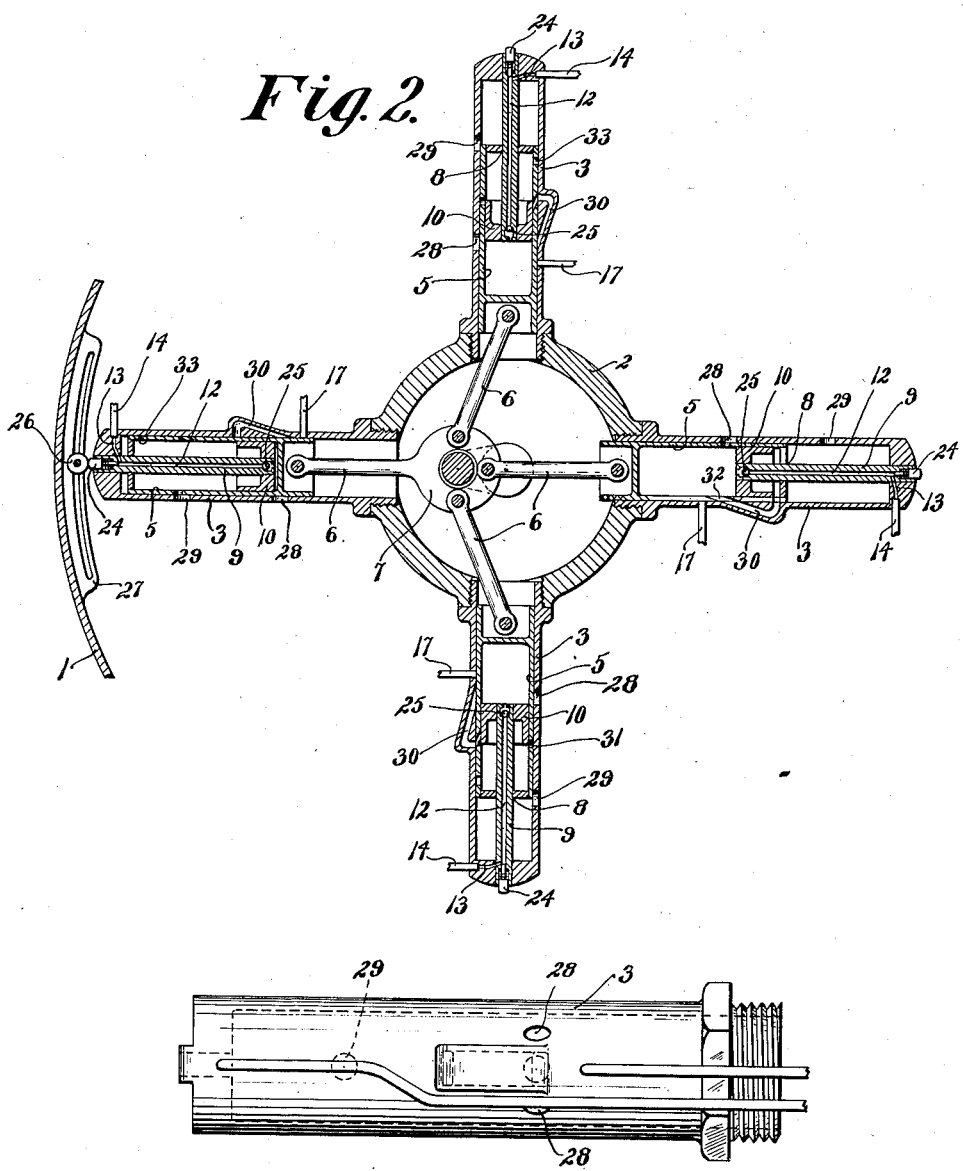
Figure 2 is a sectional view through the interior parts.
Figure 5 is a view of one of the cylinders.
Figure 3:
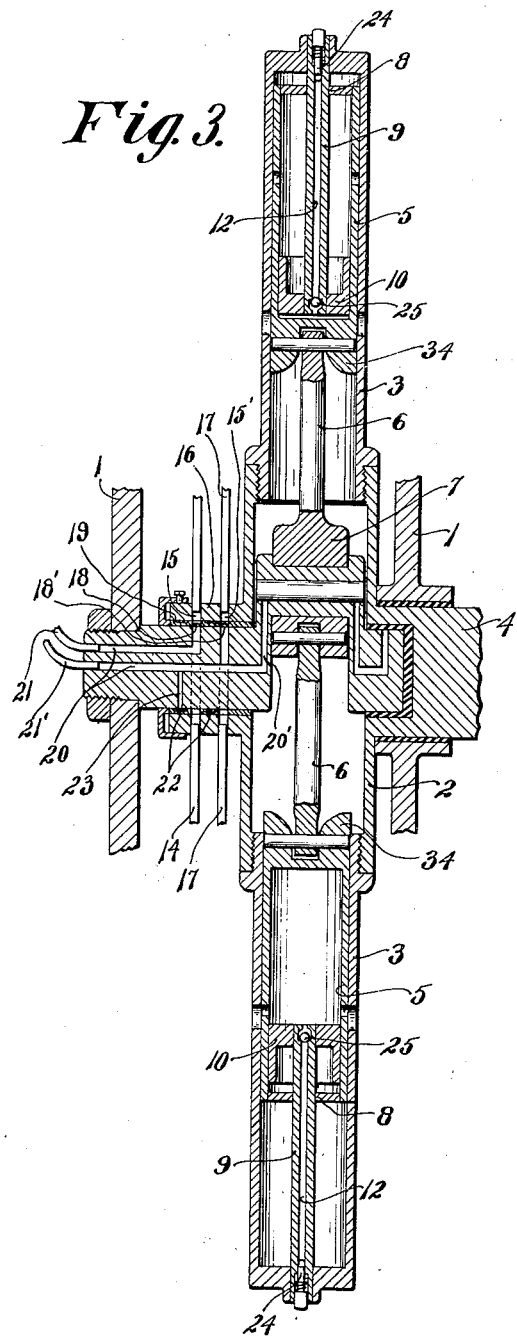
Figure 3 is a vertical sectional view through Figure 1.
Figure 6:
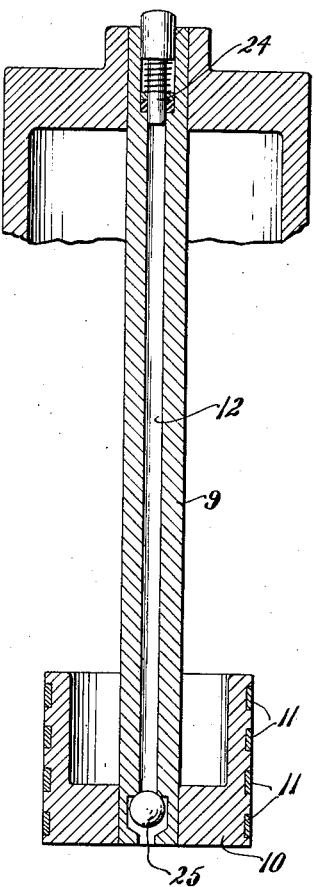
Figure 6 is a sectional view through a stationary piston, its connecting rod and a portion of the cylinder.

In these views 1 indicates a frame in which is provided the crank case 2 and the cylinders 3, said cylinders radiating from the crank case. A stationary crank shaft 4 passes through the crank case and hollow pistons 5 are arranged in the cylinders and are connected with the crank shaft by means of the connecting rods 6. The drawing shows one of the connecting rods as being formed of a collar 7 which engages the crank of the shaft and the other connecting rods are pivotally connected with said collar. Both ends of the pistons are closed but the outer ends are provided with the openings 8 through which the stems 9 of the stationary pistons 10 pass. The outer ends of the stems of these stationary pistons are secured in the outer ends of the cylinders. These pistons 10 are provided with suitable packing means 11 and a passage 12 extends through the stationary pistons and the stems, the outer end of each passage being connected by a passage 13 in the cylinder head with a delivery pipe 14 extending along the side of the cylinder and having its inner end connected with a port 15 in the reduced extension 16 of the crank case which surrounds a part of the crank shaft. A pipe 17 for lubricating oil is also connected with each cylinder to supply lubricating oil to the moving parts therein and the inner end of this pipe 17 is connected with a port 15' in the extension 16. The ports 15 and 15' are in communication with grooves 18 and 18' formed in the bearing 19 for the crank case and these grooves are in communication with the passages 20 in the crank shaft to which are connected the delivery pipes 21 and 21' which lead from suitable tanks or the like for supplying fuel oil and lubricating oil to the passages 20. The passage through which the lubricating oil passes is connected by a passage 20' to the crank part of the shaft for lubricating the sleeve 7. Suitable packing means 22 are provided for separating the grooves 18 and 18' and such means are supplied with lubricant through the passage 23. A spring plunger 24 is arranged at the outer end of the stem of each of the stationary pistons for acting to inject the fuel oil into the hollow cylinder past the check valve 25 at the head of the stationary piston. This valve 25 is normally kept closed under the action of centrifugal force. This plunger is actuated by means of the cam roller 26 which is adjustable in a part of the frame by means of the curved slotted part 27. Each cylinder is provided with the exhaust ports 28, the air intake port 29 and the bypass 30. Each piston is also provided with a plurality of exhaust ports 31, the lower air ports 32 and the upper air ports 33. The ports 32 and 33 are adapted to communicate with the bypass 30. The inner end of each piston is provided with an extension 34.

The motor shown is a two cycle one and starting with a cylinder on bottom dead center the ports are all open at 25 degrees and after the dead center is passed the bypass port is closed. Then at 35 degrees the exhaust ports are closed and compression begins. The air compresses till it is hot enough to burn the fuel oil which is injected by the plunger 24 into the cylinder from top dead center to 15 degrees before dead center, according to the starting and running conditions. The explosion brings the piston down to bottom dead center. At 35 degrees before dead center the exhaust ports open. Then at 25 degrees the bypass opens allowing air to pass from upper chamber and help expel the exhaust gases. The power stroke compresses air in the upper chamber of piston and it passes at an angle into the lower one when the bypass port is open, which carries the air to the bottom of piston. The large number of exhaust ports makes it easy to clear cylinder of exhaust gases and reduces noise of exhaust.

This engine will burn coal oil or distillate.

While the drawing shows four cylinders it will of course be understood that any desired number of cylinders may be used. The time of injection of the fuel can be controlled by adjusting the cam roller and its slot.

It is thought from the foregoing description that the advantages and novel features of the invention will be readily apparent.

We desire it to be understood that we may make changes in the construction and in the combination and arrangement of the several parts, provided that such changes fall within the scope of the appended claims.

What we claim is:—

1. A rotary motor of the class described comprising a frame, a crank case therein, cylinders radiating from the crank case, a stationary crank shaft, hollow pistons in the cylinders, means for connecting them with the crank of the shaft, a stationary piston having its head arranged in the hollow piston and having its stem passing through the head thereof and connected with the cylinder head, said hollow piston having exhaust ports therein and upper and lower air ports, each cylinder having an exhaust port, an air intake port and a bypass for connecting the air ports in the piston together, lubricating means and means for injecting fuel oil through the stationary pistons into the hollow pistons.

2. A rotary motor of the class described comprising a frame, a crank case therein, cylinders radiating from the crank case, a stationary crank shaft, hollow pistons in the cylinders, means for connecting them with the crank of the shaft, a stationary piston having its head arranged in the hollow piston and having its stem passing through the head thereof and connected with the cylinder head, said hollow piston having exhaust ports therein and upper and lower air ports, each cylinder having an exhaust port, an air intake port and a bypass for connecting the air ports in the piston together, lubricating means, means for injecting fuel oil through the stationary pistons into the hollow pistons and means for adjusting the time at which the injection will occur.

3. A motor of the class described comprising a frame, a crank case therein, cylinder radiating from the crank case, each cylinder being provided with an air inlet port, an exhaust port and a bypass, a hollow piston in each cylinder having upper and lower air ports and exhaust ports, a stationary crank shaft in the crank case, means for connecting the pistons thereto, a stationary piston having its stem connected with each cylinder head and its head arranged in the hollow piston, each hollow piston having an oil passage extending thereto, a check valve at the inner end of each passage, means for supplying fuel oil to the passages, a plunger arranged in the outer end of the stem of each stationary piston and adjustable cam means for operating the plunger to inject some of the fuel into the hollow piston.

4. A rotary motor of the class described comprising a frame, a crank case therein, cylinders radiating from the crank case, a stationary crank shaft in the case, hollow pistons in the cylinders, means for connecting the cylinders with the crank shaft, each cylinder having air intake ports and exhaust ports therein, and a bypass and each piston having upper and lower air ports and exhaust ports therein, a stationary piston in each cylinder having its head arranged in the hollow piston and its stem connected with the head of the cylinder, each stationary piston having a passage thereto, a check valve at the head end of the passage, the cylinder head having a passage therein in communication with the said passage, a spring plunger in the outer end of the stem and each stationary piston, an adjustable cam for operating the plunger to force oil from the passage into the hollow piston, a pipe connected with each of the passages in the cylinder head, means for supplying fuel oil to said pipe, a pipe connected with each cylinder for supplying lubricating oil thereto and means for supplying oil to said pipe.

5. A rotary engine of the class described comprising a frame, a crank case therein, cylinders radiating from the crank case, a stationary crank shaft in the case, hollow pistons in the cylinders, means for connecting the cylinders with the crank shaft, each cylinder having air intake ports and exhaust ports therein and a bypass and each piston having upper and lower air ports and exhaust ports therein, a stationary piston in each cylinder having its head arranged in the hollow piston and its stem connected with the head of the cylinder, each stationary piston having a passage thereto, a check valve at the head end of the passage, the cylinder head having a passage therein in communication with the said passage, a spring plunger in the outer end of the stem of each stationary piston, an adjustable cam for operating the plunger to force oil from the passage into the hollow piston, a pipe connected with each of the passages in the cylinder head, means for supplying fuel oil to said pipe, a pipe connected with each cylinder for supplying lubricating oil thereto, means for supplying oil to said pipe, the said pipe being connected with a part of the crank case, a bearing for said part having grooves therein with which the pipes communicate, the crank case having passages therein leading to the grooves, supply pipes connected with the passages and packing means separating the grooves.

In testimony whereof we affix our signatures.

CARL B. KING.
ERNEST WITHERS.